United States Patent [19]

Greenwood

[11] 4,153,177

[45] May 8, 1979

[54] NON-CORROSIVE HOLD DOWN LUG FOR TANKS

[75] Inventor: Mark E. Greenwood, Conroe, Tex.

[73] Assignee: Owens-Corning Fiberglas Corporation, Toledo, Ohio

[21] Appl. No.: 829,743

[22] Filed: Sep. 1, 1977

[51] Int. Cl.² ............................................. B65D 25/20
[52] U.S. Cl. .................................... 220/85 R; 248/500
[58] Field of Search ............... 248/359, 360, 500, 506, 248/510; 156/174, 175; 428/114; 220/85 R, 18, 69

[56] References Cited

U.S. PATENT DOCUMENTS

| | | | |
|---|---|---|---|
| 939,865 | 11/1909 | Scheck | 220/85 R X |
| 1,101,286 | 6/1914 | Jones | 220/69 X |
| 2,943,968 | 7/1960 | Freeman | 156/174 X |
| 3,379,400 | 5/1966 | Bauschard | 248/506 X |
| 3,680,727 | 8/1972 | Pearson | 220/71 X |

*Primary Examiner*—Donald F. Norton
*Attorney, Agent, or Firm*—Ronald C. Hudgens; Patrick P. Pacella; Paul J. Rose

[57] ABSTRACT

Strands of resin-impregnated glass filaments are wound on a rectangular form, the resin is cured, and the resulting rectangular tube is severed to produce two hold-down lugs. Several such hold-down lugs are secured to a tank by resin-impregnated glass filaments wound therearound.

8 Claims, 5 Drawing Figures

NON-CORROSIVE HOLD DOWN LUG FOR TANKS

This invention relates generally to hold-down lugs for tanks, and more particularly to a non-corrosive hold-down lug of thermosetting resin reinforced with substantially parallel filaments.

Prior to my invention, non-corrosive plastic tanks were generally provided with steel hold-down lugs. Frequently the steel lugs became corroded and had to be replaced at considerable expense. In accordance with my invention, non-corrosive hold-down lugs are now provided on non-corrosive tanks, these non-corrosive lugs being more durable and at least as strong as the former steel lugs.

An object of the invention is to provide non-corrosive hold-down lugs for tanks.

Another object is to provide a hold-down lug of thermosetting resin reinforced with substantially parallel filaments.

Still another object is to provide a method of making such hold-down lugs.

Other objects and advantages will become apparent when the following specification is considered along with the accompanying drawings in which.

Figure 1:
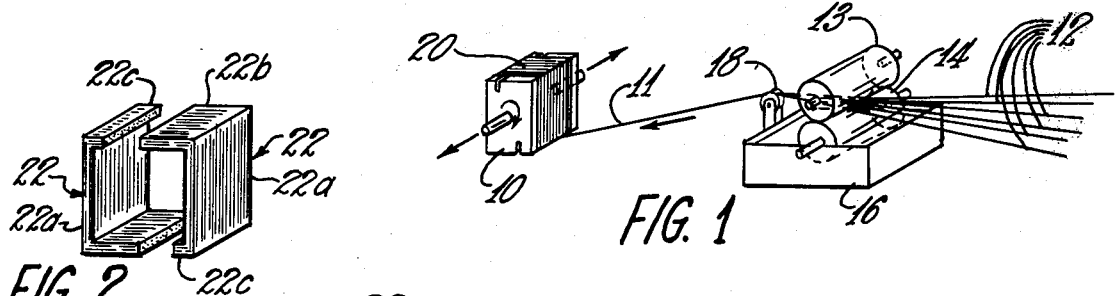
FIG. 1 is a schematic perspective view of a method of making the hold-down lugs of the invention.
Figure 2:
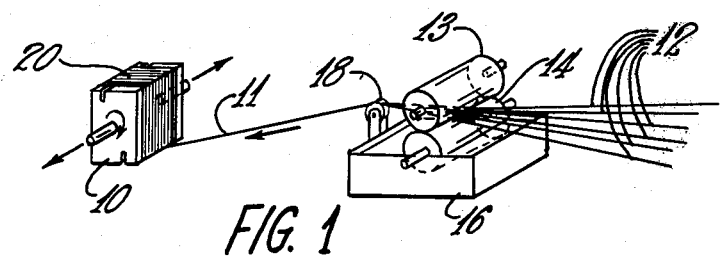
FIG. 2 is a perspective view of a pair of hold-down lugs resulting from severance of a rectangular tube produced in the method of FIG. 1.

With respect to the drawings, FIG. 1 shows a rotatably mounted rectangular form 10 being wound with a strand 11 of glass filaments 12. The filaments 12 are impregnated with resin by being fed between a pair of rollers 13 and 14. The lower roller 14 is partly submerged in resin contained in an open-top container 16. The filaments 12 are gathered on a guide pulley 18 to form the strand 11. The form 10 is reciprocated axially as it is being rotated to space successive windings of the strand 11 and form a rectangular tube 20 which is severed longitudinally on a pair of opposite sides in offset planes as shown in FIG. 2 after the resin is hardened to form a pair of hold-down lugs 22. Preferably end flanges (not shown) are provided on the form 10 to shape the end faces of the lugs 22. The amount of axial movement per revolution of the form 10 is relatively small, and the segments of the strand 11 are very nearly perpendicular to the edges of the form. All segments of the strand 11 on one side of the form are substantially parallel to each other, even though those of one layer are slightly inclined oppositely from those of an adjacent layer. Each lug 22 is generally L-shaped in cross-section and includes a normally vertical leg portion 22a and a normally horizontal leg portion 22b, the leg portion 22b being suitable for clamping to a mounting surface. Preferably each lug 22 also includes a relatively short flange portion 22c opposite, parallel to, and shorter than the leg portion 22b.

Figure 3:
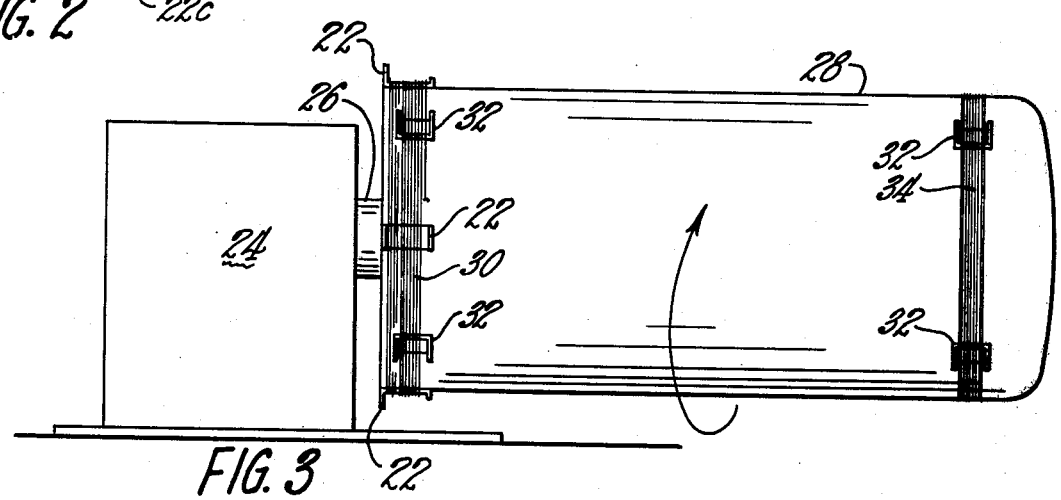
FIG. 3 is a schematic elevational view of a mandrel and a tank formed thereon, showing how hold-down lugs of the invention may be attached to the tank.

FIG. 3 shows a housing 24 which supports a rotatably driven mandrel 26 on which a tank 28 of glass fiber reinforced thermosetting resin is produced. Several of the hold-down lugs 22 are secured to the tank 28 adjacent the bottom thereof by windings of a continuous resin-impregnated strand 30 of glass filaments applied before the tank 28 is fully cured. Upon final curing, the strand 30 becomes an integral part of the tank 28 and the hold-down lugs 22 are securely fastened in place. Several lifting lugs 32 are secured to the tank 28 adjacent the top thereof by windings of another continuous resin-impregnated glass strand 34, and at least one of the lifting lugs 32 is secured to the tank 28 adjacent the bottom by the windings of the strand 30. The lifting lugs 32 are the subject of my copending application, Ser. No. 829,748, filed Sept. 1, 1977.

Figure 4:
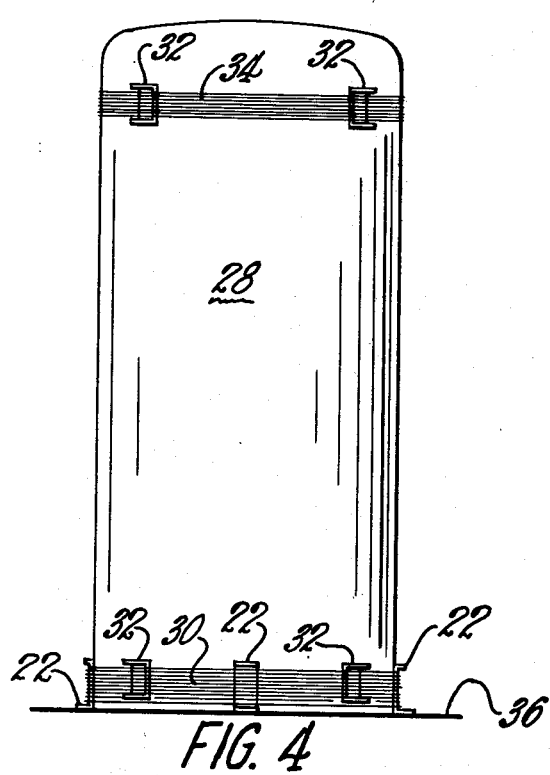
FIG. 4 is an elevational view of an installed tank having hold-down lugs of the invention.
Figure 5:
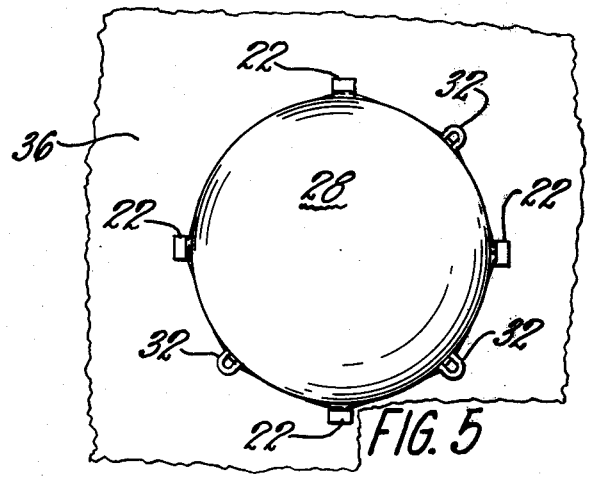
FIG. 5 is a plan view of the tank of FIG. 4.

FIGS. 4 and 5 show the tank 28 mounted on a supporting surface 36. The hold-down lugs 22 may be clamped against the surface 36 by suitable clamping means (not shown).

I claim:

1. A non-corrosive hold-down lug for tanks, the lug being generally L-shaped and comprising resin reinforced with a plurality of reinforcing strands extending substantially parallel to each other and each generally defining an L-shape.

2. A lug as claimed in claim 1 including a relatively short flange portion extending from an opposite end of one leg portion of the lug from the end from which another leg portion extends, the reinforcing strands also extending through the flange portion.

3. A lug as claimed in claim 1 wherein the reinforcing strands are continuous glass filaments.

4. A tank having secured thereto a non-corrosive generally L-shaped hold-down lug of resin reinforced with a plurality of reinforcing strands extending substantially parallel to each other and each generally defining an L-shape.

5. A tank and lug as claimed in claim 4 wherein the reinforcing strands are continuous glass filaments.

6. A tank and lug as claimed in claim 4, the tank comprising glass fiber reinforced resin.

7. A tank and lug as claimed in claim 4 wherein windings of continuous resin-impregnated strand secure the lug to the tank.

8. A tank and lug as claimed in claim 7 wherein the winding strand comprises continuous glass filaments.

* * * * *